United States Patent
Matsumoto et al.

(10) Patent No.: US 10,379,518 B2
(45) Date of Patent: Aug. 13, 2019

(54) NUMERICAL CONTROL DEVICE AND CONTROL SYSTEM

(71) Applicant: FANUC Corporation, Minamitsuru-gun, Yamanashi (JP)

(72) Inventors: Eiji Matsumoto, Minamitsuru-gun (JP); Keiichiro Miyajima, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 443 days.

(21) Appl. No.: 14/944,547

(22) Filed: Nov. 18, 2015

(65) Prior Publication Data

US 2016/0139586 A1    May 19, 2016

(30) Foreign Application Priority Data

Nov. 19, 2014  (JP) ................................. 2014-234676

(51) Int. Cl.
    *G05B 19/19*         (2006.01)
    *G05B 19/414*      (2006.01)

(52) U.S. Cl.
    CPC ........... *G05B 19/19* (2013.01); *G05B 19/414* (2013.01); *G05B 2219/34015* (2013.01)

(58) Field of Classification Search
    CPC .................. G05B 19/19; G05B 19/414; G05B 19/34015; G05B 2219/34015; G05B 19/184; G05B 2219/41326; G05B 19/29; G05B 2219/34076
    USPC ........................................ 700/173, 186, 160
    See application file for complete search history.

(56) References Cited

U.S. PATENT DOCUMENTS

| | | | |
|---|---|---|---|
| 5,027,045 A | 6/1991 | Iwagaya | |
| 6,011,374 A * | 1/2000 | Ulbrich | G01P 15/003 |
| | | | 318/569 |
| 6,310,457 B1 * | 10/2001 | Iwashita | G05B 19/232 |
| | | | 318/568.22 |

(Continued)

FOREIGN PATENT DOCUMENTS

| | | |
|---|---|---|
| CN | 1987701 A | 6/2007 |
| CN | 101633181 A | 1/2010 |

(Continued)

OTHER PUBLICATIONS

The Notification of the First Office Action dated Oct. 30, 2017 in Chinese Patent Application No. 2015107962401 (5 pages) with an English translation (7 pages).

(Continued)

*Primary Examiner* — Dzung Tran
(74) *Attorney, Agent, or Firm* — Drinker Biddle & Reath LLP

(57) ABSTRACT

A numerical control device for controlling a first control axis configured to operate in shorter period than reference control period based on first input command input by a first external input device, wherein a movement command data calculation processing unit is configured to calculate a plurality of the movement command data commanding movement amount of axis to be moved by the first control axis during the reference control period and write the plurality of the movement command data in a first buffer in process of calculating the movement command data.

3 Claims, 7 Drawing Sheets

(56) References Cited

U.S. PATENT DOCUMENTS

| | | | | |
|---|---|---|---|---|
| 6,316,903 | B1* | 11/2001 | Shamoto | G05B 19/416 |
| | | | | 318/625 |
| 6,386,008 | B1* | 5/2002 | Virtanen | B21D 5/02 |
| | | | | 72/19.8 |
| 2007/0138989 | A1* | 6/2007 | Iwashita | G05B 19/19 |
| | | | | 318/272 |
| 2011/0253099 | A1* | 10/2011 | Han | F02D 41/0097 |
| | | | | 123/350 |
| 2015/0134101 | A1 | 5/2015 | Iuchi | |

FOREIGN PATENT DOCUMENTS

| | | |
|---|---|---|
| CN | 104380217 A | 2/2015 |
| JP | H01-133115 A | 5/1989 |
| JP | H01-184506 A | 7/1989 |
| JP | 2997270 B2 | 1/2000 |
| JP | 2004-139253 A | 5/2004 |

OTHER PUBLICATIONS

Decision to Grant a Patent dated Oct. 25, 2016 in Japanese Patent Application No. 2014-234676 (3 pages) with an English Translation (3 pages).

\* cited by examiner

NUMERICAL CONTROL DEVICE AND CONTROL SYSTEM

RELATED APPLICATION DATA

This application claims priority under 35 U.S.C. § 119 and/or § 365 to Japanese Application No. 2014-234676 filed Nov. 19, 2014, the entire contents is incorporated herein by reference.

BACKGROUND OF THE INVENTION

1. Field of the Invention

The present invention relates to a numerical control device, and more specifically a numerical control device for controlling high speed response control axis without shortening control period of entire numerical control device and generating wasting waiting time.

2. Description of the Related Art

A numerical control device, can perform response control to control a control axis to be controlled corresponding to input from an external input device (such as a signal generation device, a communication device). For example, in a machine for performing punch press machining, detection signal is input to a numerical control device when it is detected that a punching tool leaves from a workpiece after hole punching by a punching tool, while the numerical control device performs response control of table axes (X axis, Y axis) corresponding to the input signal and make the workpiece to a next punching point.

In the device, high speed response with shortened control period of response control for responding as quickly as possible enables effective machining. However, in a conventional numerical control device, the control period of response control is fixed for each numerical control device, and all control axes has the same period. Therefore, it is impossible to shorten only the control period of the response control for a high response control axis which requires high speed response. In addition to that, it is possible to shorten the control period of response control by shortening the control period of entire numerical control device. However, since introduction of a high speed CPU, capable of completing all control processing in short control period, and the like, is required for shortening the control period of entire numerical control device, shortening of the control period can not be easily implemented.

Concerning an outputting technique of interpolation command for a high speed control axis, Japanese Patent Laid-Open No. 01-184506 discloses a technique in which, n pieces of command at 1/n times period of normal period (entire device) are output together at the normal period (entire device), as shown in FIG. 9.

There is a problem in the conventional numerical control device, that even when a command is input from an external device in short period for a high speed response control axis, wasting waiting time is generated from the input of command to response by the control axis, since the control axis can not read the command till the next control period.

For example, in the numerical control device descried in Japanese Patent Laid-Open No. 01-184506, the control period of response control for responding to an input command form an external input device to control the axis is fixed for each control device. Therefore, even for a axis which requires high speed response to an input command from a high speed external input device, response control is performed in the normal control period.

FIG. 10 shows a timing chart illustrating cyclic operation of an external device which outputs a command for a high speed control axis at ¼ times period of the normal control period and a numerical control device and servo control, in the numerical control device descried in Japanese Patent Laid-Open No. 01-184506. As shown in FIG. 10, the numerical control device descried in Japanese Patent Laid-Open No. 01-184506, even when a command is input at short period corresponding to period of servo control, since input detection processing and movement command calculation processing are executed in the normal period, the detection and the calculation of the movement command is waited until starting of the next control period in the control period of the numerical control machine. As a result, a case may happen in which the numerical control device can not perform high speed response and generates wasting waiting time.

SUMMARY OF THE INVENTION

Here, an object of the present invention is to provide a numerical control device for controlling high speed response control axis without generating wasting waiting time.

A numerical control device according to the present invention is the numerical control device for controlling a first control axis configured to operate in shorter period than reference control period based on first input command input by a first external input device, the numerical control device including a first buffer configured to store movement command data commanding axis movement amount of the first control axis, a movement command data calculation processing unit configured to calculate the movement command data based on control program at each reference control period and write the movement command data in the first buffer, and an input detection processing unit configured to operate at same period as the first control axis and acquire the movement command data from the first buffer on receiving the first input command and control the first control axis, wherein the movement command data calculation processing unit is configured to calculate a plurality of the movement command data commanding movement amount of axis to be moved by the first control axis during the reference control period and write the plurality of the movement command data in the first buffer in process of calculating the movement command data.

The shorter period than the reference control period may be 1/n times of the reference control period, and number of the plurality of movement command data may be n.

The numerical control device may further control a second control axis configured to operate in m/n times period of the reference control period based on a second input command input by a second external input device, and the numerical control device may further include a second buffer configured to store movement command data commanding movement amount of the second control axis, wherein the movement command data calculation processing unit is configured to calculate the movement command data to be used for control of the second control axis and write the movement command data in the second buffer, and the input detection processing unit is configured to acquire the movement command data from the second buffer at m operation period of the second control axis when the second input command and transfer the movement command data to a servo control unit for controlling the second control axis.

A control system is the control system having a servo mechanism for controlling a first control axis configured to operate in shorter period than reference control period based on first input command input by a first external input device and a numerical control device configured to output movement command data commanding axis movement amount of the first control axis to the servo mechanism, the numerical control device including a first buffer configured to store movement command data commanding movement amount of the first control axis, and a movement command data calculation processing unit configured to calculate the movement command data based on control program at each reference control period and write the movement command data in the first buffer, and the servo mechanism including an input detection processing unit configured to operate at same period as the first control axis and acquire the movement command data from the first buffer on receiving the first input command and transfer the movement command data to a servo control unit for controlling the first control axis, wherein, the movement command data calculation processing unit is configured to calculate a plurality of the movement command data commanding movement amount of axis to be moved by the first control axis during the reference control period and write the plurality of the movement command data in the first buffer in process of calculating the movement command data.

The present invention, with the above configuration, can perform response control high speed response control axis, which is controlled in shorter period than control period of entire device, without generating wasting waiting time, by shortening only operation period of input detection processing without shortening control period of entire numerical control device.

The technique of the present invention is preferably applied to, for example, a control device for controlling a machining tool equipped with a response control axis operating at high speed, such as control of press control axis and table control axis of the control device for punch press machining.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
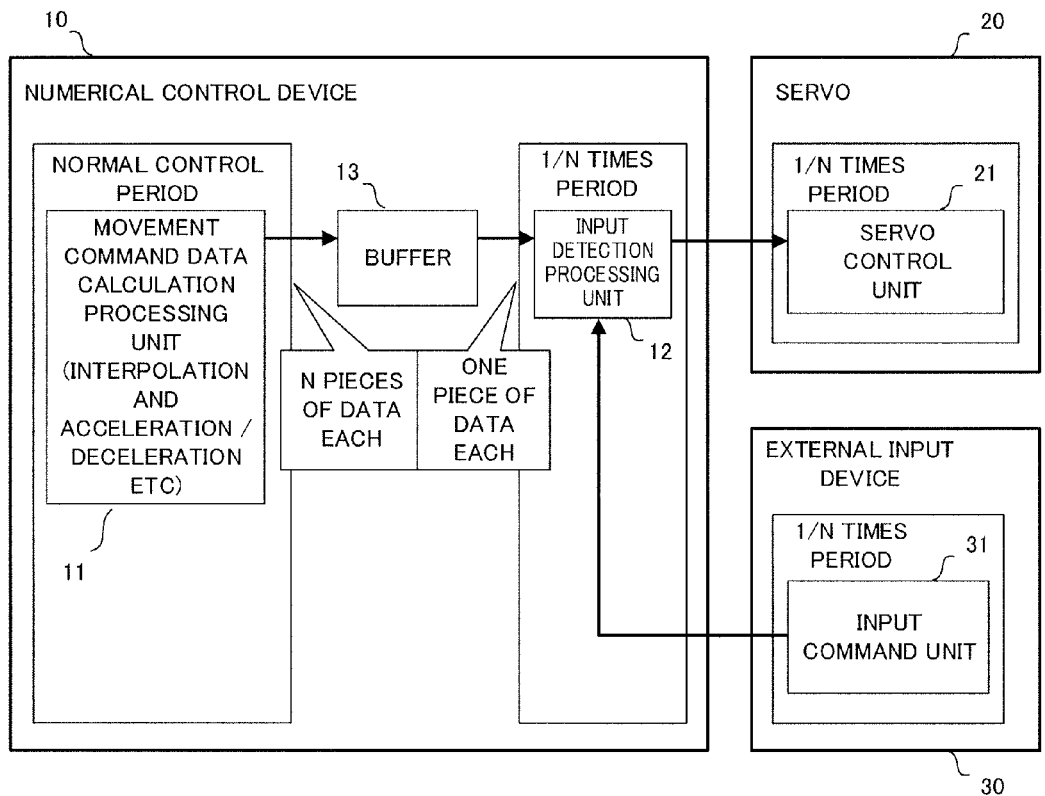
FIG. 1 is a schematic block diagram of a numerical control device according to a first embodiment of the present invention.

The following describes embodiments of the present invention, with reference to the drawings. The same reference numerals are assigned to the configuration similar to the prior art. In the following, reference control period, such as control period of entire device, will be referred to as normal control period.

Elementary technique in the present embodiment will be described first. In the present embodiment, FIFO type buffer (cue) with arbitrary size more than n is provided at each control axis of a control device, and an input detection unit for detecting high speed input command from an external device at 1/n times period of the normal period is added (n is integer). The FIFO type buffer may be implemented by a rig buffer or the like.

The numerical control device in the present invention calculates n pieces of data of movement command (interpolation command) for high speed response control axis to be controlled by, for example, a method described in Japanese Patent Laid-Open No. 01-184506 or the like, and write the data in the buffer, when the numerical control device determines that condition for starting response control of the high speed response control is satisfied. Then, in input detection processing, when the numerical control device detects an input command from an external input device, reads the movement command (interpolation) data in the buffer, and sequentially transfer the movement command data to servo control at each period of the input detection processing. It should be noted that, even when conditional judgement for starting response control of the high speed response control axis does not exist, the effect in the present embodiment is not affected at all.

Thus, by providing the input detection processing to be executed at 1/n times period of the normal control period separately from the control processing of the numerical control device, the present embodiment accelerates the response control of the high speed response control axis without accelerating the control period of entire numerical device. With the configuration above, the present embodiment can be implemented without introducing a high speed CPU, since only the input detection processing with relatively reduced processing load is operated at shorter period than the normal control period and the control period of normal control processing to be executed in the numerical control device is not changed.

FIG. 1 is a schematic block diagram of a numerical control device according to a first embodiment of the present invention.

The numerical control device in the present invention includes a movement command data calculation processing unit 11 which operates at the normal control period, an input detection processing unit 12 which operates at 1/n times period of the normal control period, and a buffer 13 provided between the movement command data calculation processing unit 11 and the input detection processing unit 12 for mediating the movement command data output from the movement command data calculation processing unit 11.

The movement command data calculation processing unit 11 performs analysis of the command, interpolation processing, acceleration/deceleration processing, and the like, based on program, to calculate and output the movement command data. The movement command data calculation processing unit 11 operates at the normal control period and outputs the movement command data at each control period for a control axis with normal control period, but when the movement command data calculation processing unit 11 determines that a condition for starting response control of the high speed response control axis based on various conditions such as executing state of the program or signal state, the movement command data calculation processing unit 11 calculates n pieces of movement command data for n periods for the high speed response control axis to be controlled using, for example, the method described in Japanese Patent Laid-Open No. 01-184506, and write the data in the buffer 13.

The input detection processing unit 12 detects input command from an input command unit 31 of an external input device 30, and acquires the movement command data written in the buffer when the input command is detected to transfer the data to a servo control unit 21 of a servo 20. The input detection processing unit 12 operates at 1/n times period of the normal control period. The input detection processing unit 12 can detect the input command input from the input command unit 31 of the external input device which operates at 1/n times period of the normal control period almost without delay and can transfer the movement command data to the servo control unit 21 of the servo 20 which operates at 1/n times period of the normal control period almost without delay.

The buffer 13 mediates the movement command data output from the movement command data calculation processing unit 11, and is configured as a FIFO type buffer. In the present embodiment, the buffer 13 is implemented as a ring buffer with more than n buffer size.

Figure 2A:
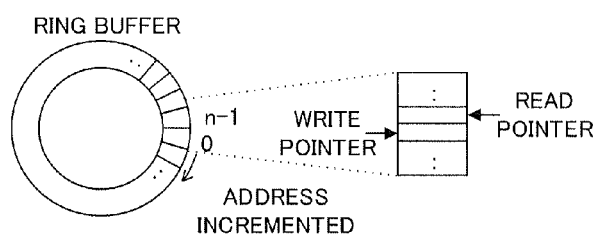
FIGS. 2A, 2B, and 2C are schematic diagrams illustrating a ring buffer.
Figure 2B:
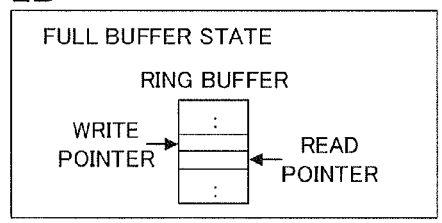
Figure 2C:
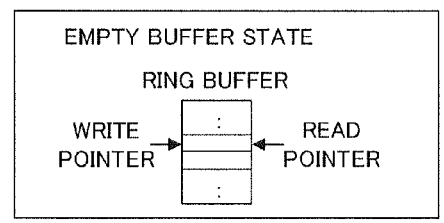

FIGS. 2A, 2B, and 2C are schematic diagrams illustrating configuration of the ring buffer. As shown in FIG. 2A, the ring buffer secures a specified region in memory, and has configuration in which the end and top of the secured region are connected in ring configuration. Data stored in the ring buffer is managed by a write pointer and a read pointer. When writing processing in the buffer is executed, the data is written in the memory location designated by the write pointer and the write pointer is incremented, while when reading processing of the buffer is executed the data in the memory location designated by the read pointer is read and the read pointer is incremented. The write pointer and the read pointer return value of the pointer to be the value of the top of the memory region when the memory location designated by the pointer exceeds the end of the memory region secured as the ring buffer. The FIFO type buffer is implemented as control descried above.

In read/write control of the ring buffer, as shown in FIG. 2B, state of the buffer is determined to be full and writing processing is forbidden when the write pointer designates the memory location one less than the read pointer or when the write pointer designates the memory location of the end of the memory region secured as the ring buffer and the read pointer designates the top memory point. When the buffer is in full state, data is read form the buffer and the read pointer is incremented such that the buffer is released from the full state.

As shown in FIG. 2C, the state of the buffer is determined to be empty when the write pointer designates same memory point as the read pointer, since it is indicated that no data is in the ring buffer, and the reading processing is forbidden till new data is written in the ring buffer.

Figure 3:
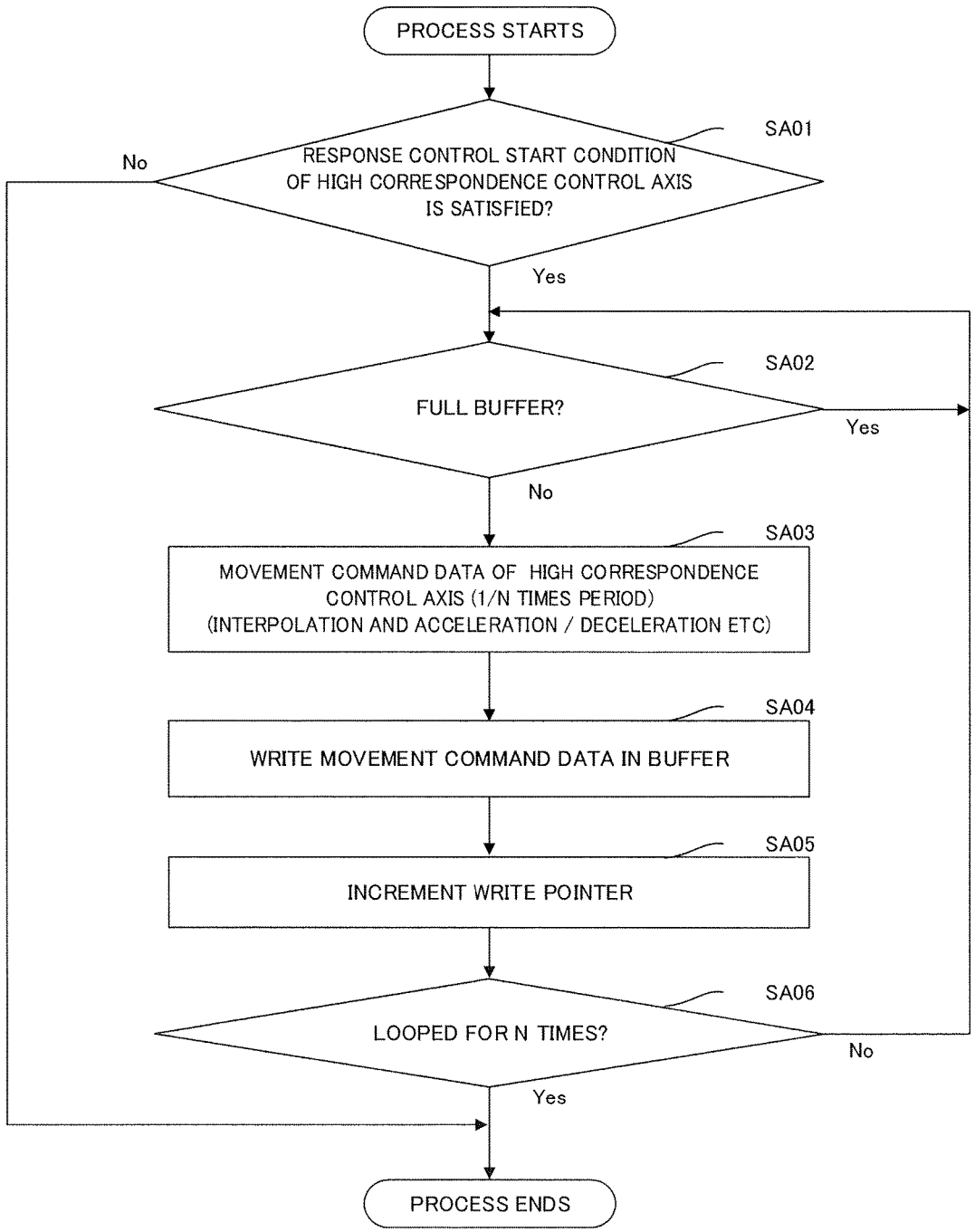
FIG. 3 is a schematic flowchart of movement command data calculation processing according to a first embodiment of the present invention.

FIG. 3 is a schematic flowchart of movement command data calculation processing executed by the movement command data calculation processing unit 11 of the numerical control device 10 in the present embodiment. The present processing is executed at each control period.

[Step SA01] It is determined whether the condition for starting the response control of the high speed response control axis is satisfied based on various conditions such as execution state of the program, signal state, and the like. The process proceeds to Step SA02 when the condition is satisfied, while the process ends when the condition is not satisfied.

[Step SA02] It is determined whether the state of the buffer 13 is full or not. The state of the buffer 13 is monitored until the buffer becomes available when the state of the buffer 13 is full, while the process proceeds to Step SA03 when the state of the buffer 13 is not full.

[Step SA03] The movement command data for outputting to the high speed response control axis (which operates at 1/n times period of the normal control period) to be controlled is calculated based on the program for control or the like.

[Step SA04] The movement command data calculated in Step SA03 is written in the buffer 13.

[Step SA05] The write pointer is incremented in the buffer 13.

[Step SA06] It is determined whether the process has looped for n times, that is, whether n pieces of movement command data for n periods are calculated and stored in the buffer. If the process has not looped for n times, the process returns to Step SA02, while if the process has looped for n times, the process ends.

Figure 4:
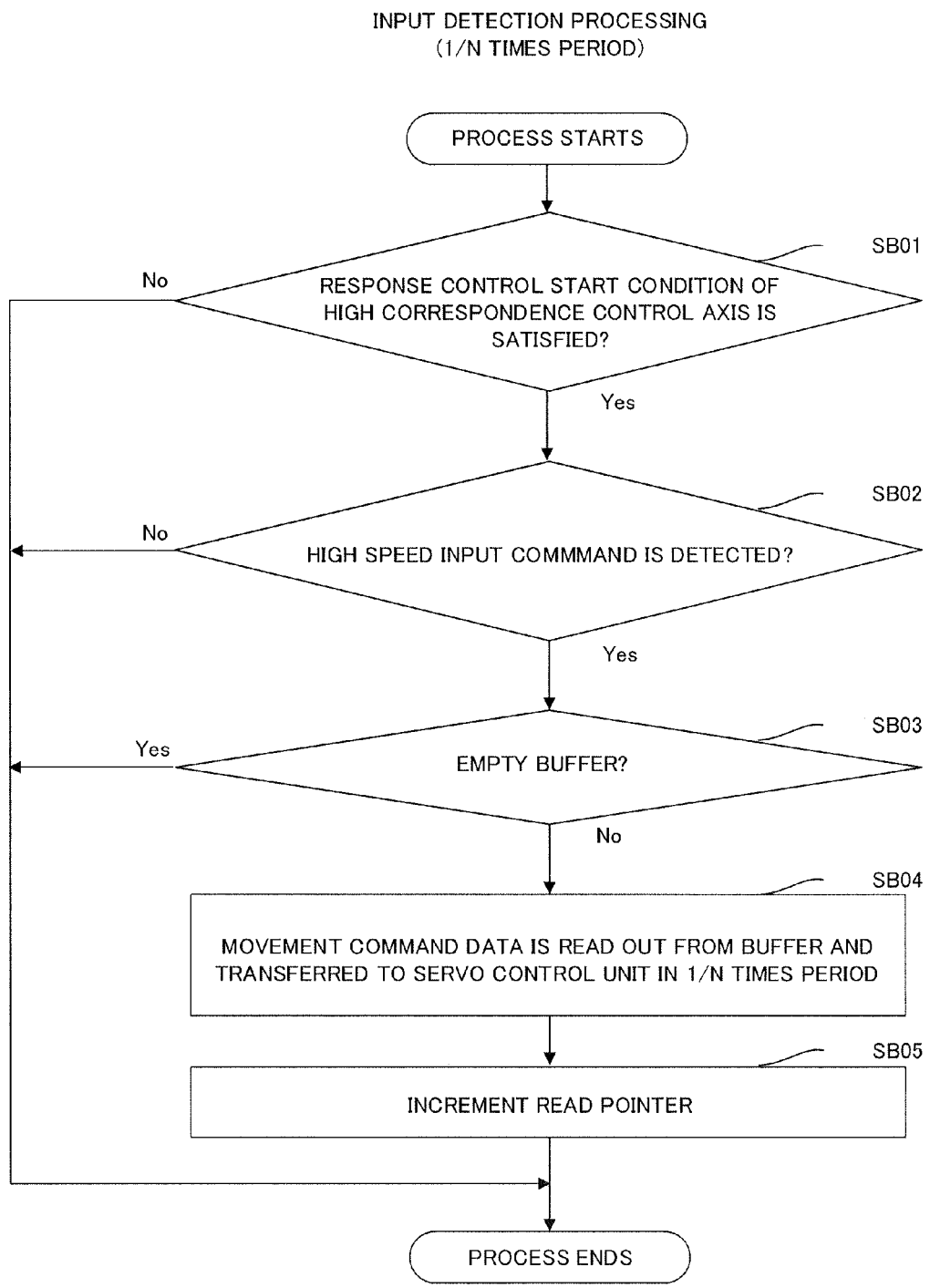
FIG. 4 is a schematic flowchart of input detection processing according to a first embodiment of the present invention.

FIG. 4 is a schematic flowchart of input detection processing executed by the input detection processing unit 12 of the numerical control device 10 in the present embodiment. The present processing is executed at each 1/n times period of the normal control period.

[Step SB01] It is determined whether the condition for starting the response control of the high speed response control axis is satisfied based on various conditions such as execution state of the program, signal state, and the like. The process proceeds to Step SB02 when the condition is satisfied, while the process ends when the condition is not satisfied.

[Step SB02] It is determined whether input of a high speed input command through the input command unit 31 of the external input device 30 is detected or not. The process proceeds to Step SB03 when the input is detected, while the process ends when the input is not detected.

[Step SB03] It is determined whether the state of the buffer 13 is full or not. The state of the buffer 13 is monitored until the buffer becomes available when the state of the buffer 13 is full, while the process proceeds to Step SB04 when the state of the buffer 13 is not full.

[Step SB04] A piece of movement command data is read from the buffer 13 and transferred to the servo control unit 21 of the servo 20 operating at 1/n times period of the normal control period.

[Step SA05] The read pointer is incremented in the buffer 13.

Figure 5:
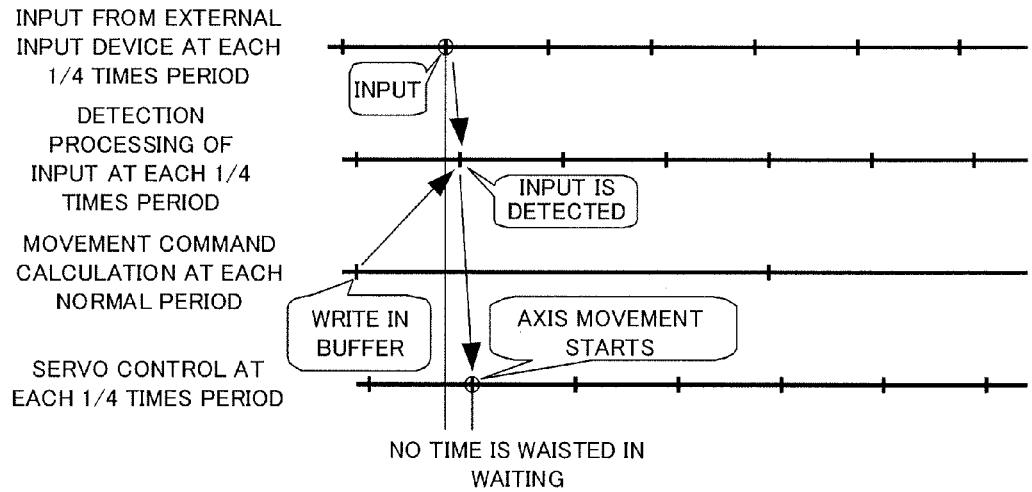
FIG. 5 is a timing chart illustrating cyclic operation of an external input device, and a numerical control device and servo control according to a first embodiment of the present invention.
Figure 10:
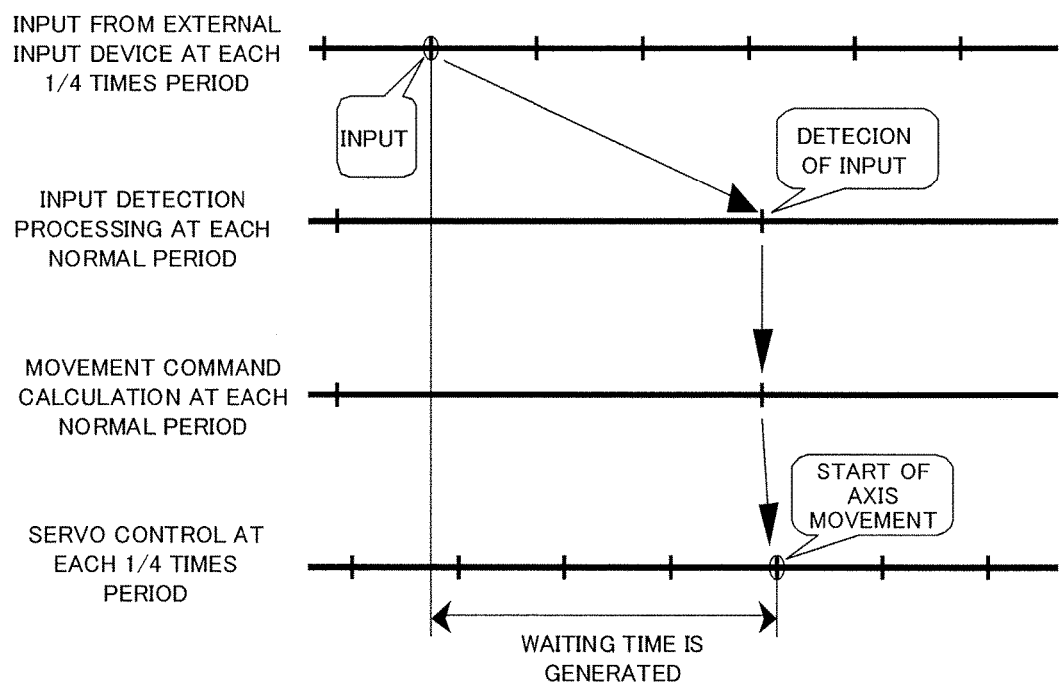
FIG. 10 is a timing chart illustrating cyclic operation of an external input device, and a numerical control device and servo control in a prior art.

FIG. 5 is a timing chart illustrating cyclic operation of the external input device which outputs a command to the high speed response control axis at ¼ times period of the normal control period, and the numerical control device and servo control in the numerical control device of the present embodiment. As is clearly seen when compared to the prior art explained in FIG. 10, the numerical control device 10 in the present embodiment enable control without generating wasting waiting time for the high speed response control axis operating at ¼ times period of the normal control period, since when a command is input at short period corresponding to the period of servo control, the input detection processing unit 12 in the numerical control device also operates at each ¼ times period of the normal control period, the input is detected almost without delay for the input and the movement command data is transferred from the buffer 13 to the input detection processing unit 12.

The input detection processing unit 12 can detect the input command input from the input command unit 31 of the external input device 30 which operates at 1/n times period of the normal control period almost without delay and can transfer the movement command data to the servo control unit 21 of the servo 20 which operates at 1/n times period of the normal control period almost without delay.

Figure 6:
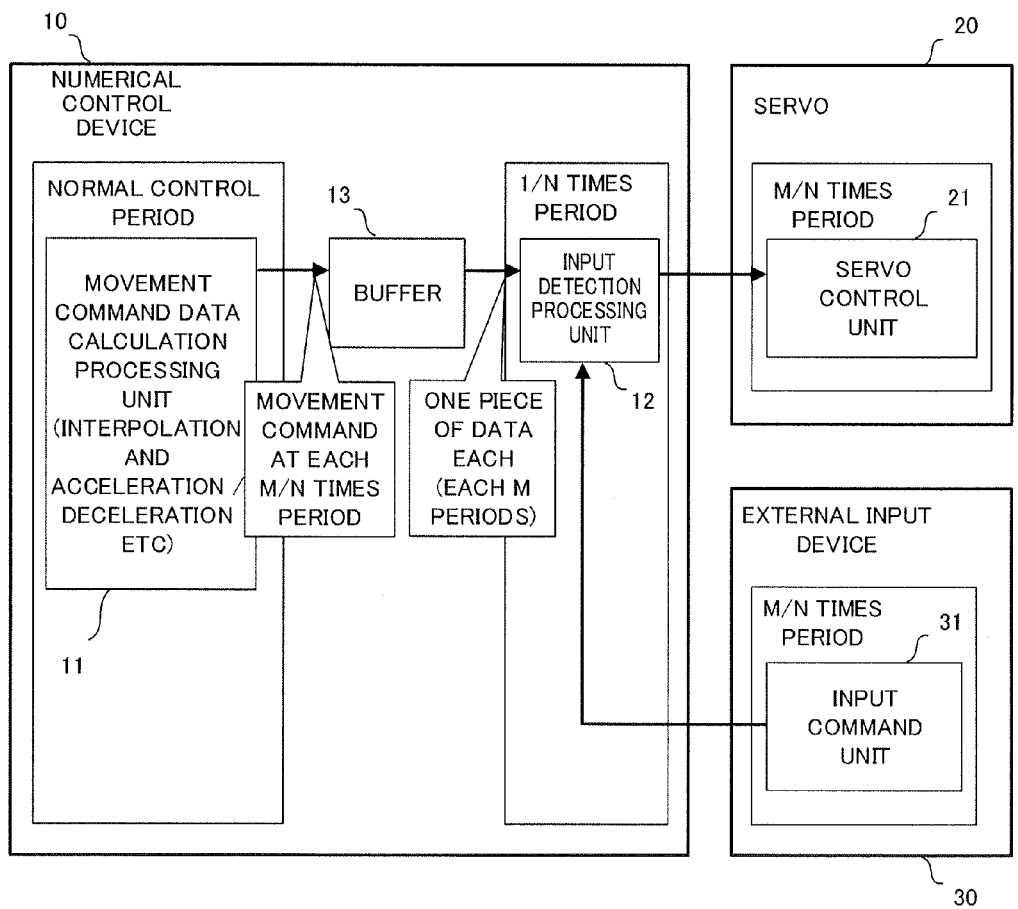
FIG. 6 is a schematic block diagram of a numerical control device according to a second embodiment of the present invention.

Control of the high speed response control axis operating at each 1/n times period of the normal control period is described above as the first embodiment of the present invention. However, it is also possible to correspond to the control axis operating at each m/n times period of the normal control period by introducing the technique of the present invention (n, m are integer value). FIG. 6 is a schematic block diagram of the numerical control device corresponding to the control axis operating at each m/n times period of the normal control period, according to the second embodiment of the present invention.

The numerical control device in the present invention, as the numerical control device in the first embodiment, includes the movement command data calculation processing unit 11 which operates at the normal control period, the input detection processing unit 12 which operates at 1/n times period of the normal control period, and the buffer 13. The numerical control device in the present embodiment corresponds to the control axis operating at m/n times period of the normal control period by making the input detection processing unit 12 operating at 1/n times period of the normal control period transfer the movement command data at each m periods.

For example, when the normal control period is 4 ms, and the control axis operating at 1 ms period (n=4) and the control axis operating at 16 ms period (m=16) are included, the input detection processing unit 12 operating at 1 ms period (¼ times period of the normal control period) executes processing at each 16 periods to correspond to the control axis operating at 16 ms control period.

Figure 7:
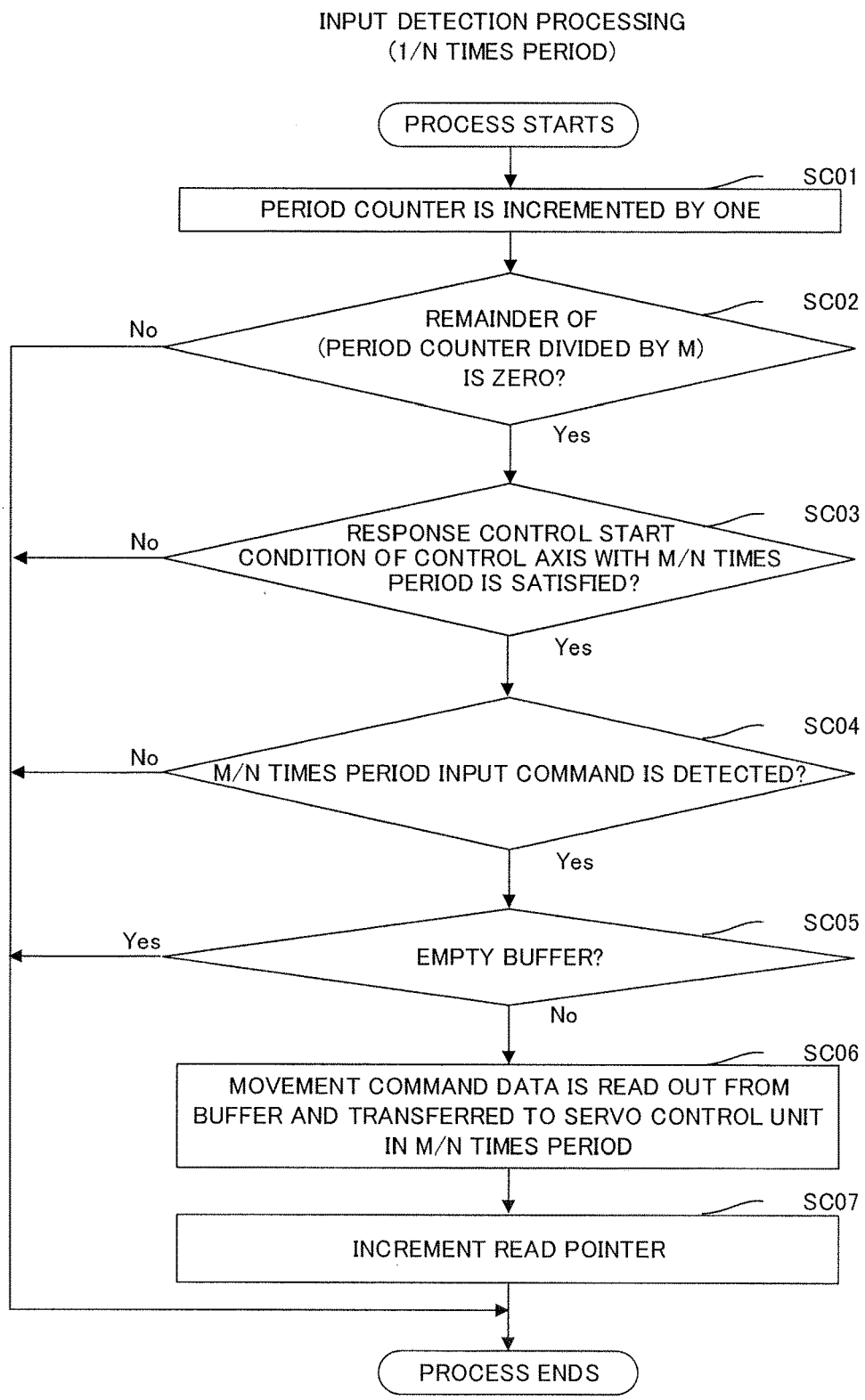
FIG. 7 is a schematic flowchart of input detection processing according to a second embodiment of the present invention.

FIG. 7 is a schematic flowchart of input detection processing executed by the input detection processing unit 12 of the numerical control device 10 in the present embodiment. The present processing is executed at each 1/n times period of the normal control period in the present embodiment. It should be noted that a cycle counter is set to be zero at initializing processing at start of the operation control of the numerical control device 10.

[Step SC01] Cycle counter is incremented by one.
[Step SC02] It is determined whether the cycle is at a multiple of m period using, for example, remainder of value of the cycle counter divided by m. The process proceeds to Step SC03 when the remainder of value of the cycle counter divided by m is zero, while the process ends when not.
[Step SC03] It is determined whether the condition for starting the response control of the control axis which operates at m/n times period of the normal control period is satisfied based on various conditions such as execution state of the program, signal state, and the like. The process proceeds to Step SC04 when the condition is satisfied, while the process ends when the condition is not satisfied.
[Step SC04] It is determined whether input of an input command at m/n times period of the normal control period through the input command unit 31 of the external input device 30 is detected or not. The process proceeds to Step SC05 when the input is detected, while the process ends when the input is not detected.
[Step SC05] It is determined whether the state of the buffer 13 is full or not. The state of the buffer 13 is monitored until the buffer becomes available when the state of the buffer 13 is full, while the process proceeds to Step SC06 when the state of the buffer 13 is not full.
[Step SC06] A piece of movement command data is read from the buffer 13 and transferred to the servo control unit 21 of the servo 20 operating at m/n times period of the normal control period.
[Step SC07] The read pointer is incremented in the buffer 13.
[Step SC07] The read pointer is incremented in the buffer 13.

As described above, the numerical control device 10 in the present embodiment enables response control of the control axis operating at m/n times period of the normal control period by using input detection processing at 1/n times period of the normal control period. For example, control of the high response control axis operating at 1/n times period of the normal control period and control of the control axis operating at m/n times period of the normal control period can be simultaneously implemented by executing the processing shown in the flowchart in FIG. 4 and the processing shown in the flowchart in FIG. 7 at each 1/n times period of the normal control period in the input detection processing unit 12.

The embodiments of the present invention are described above. The present invention is not limited to the above-described embodiments, and, configuration thereof can be appropriately modified to be implemented in the other embodiments.

Figure 8:
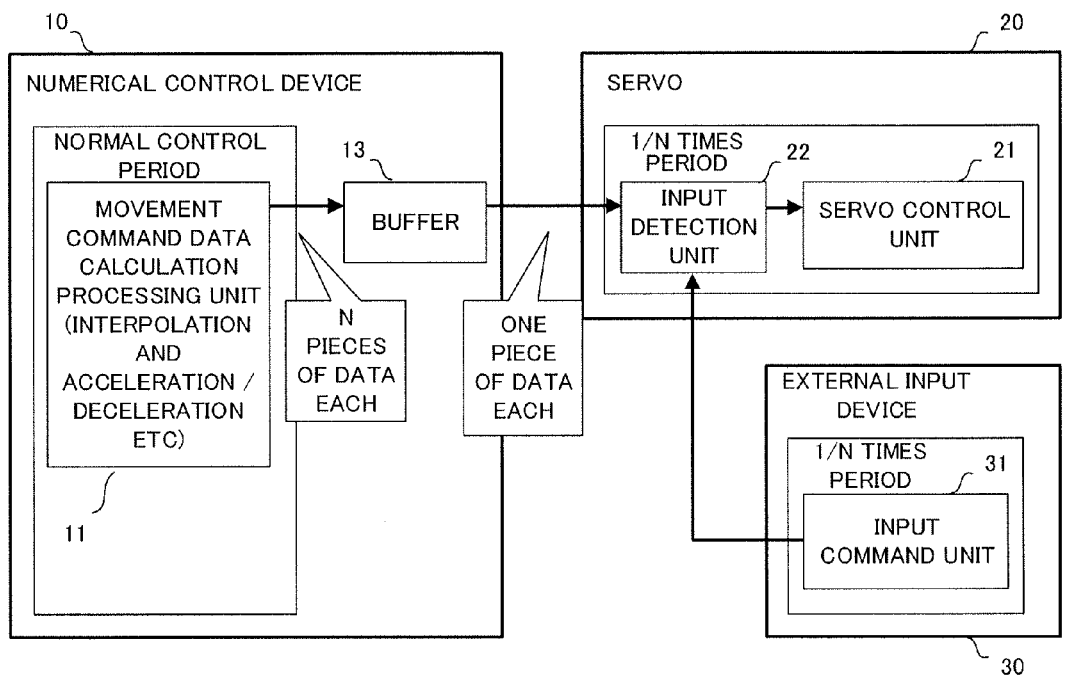
FIG. 8 is a schematic block diagram of a numerical control device according to another embodiment of the present invention.
Figure 9:
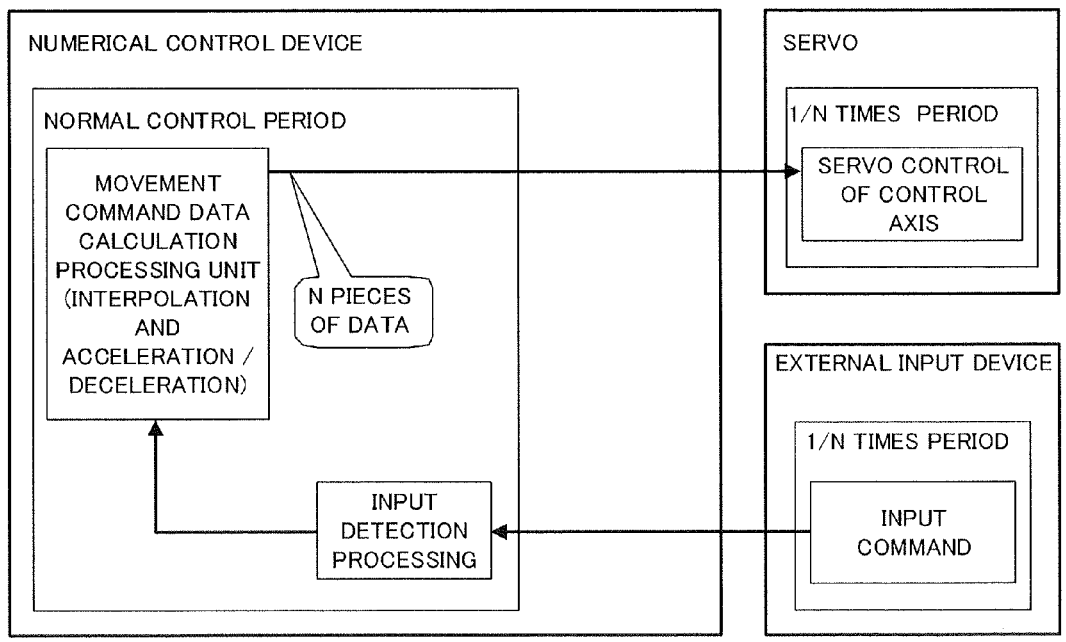
FIG. 9 is a schematic block diagram of a numerical control device for controlling a high speed response control axis according of a prior art.

For example, in the embodiments, an example is shown in which the input detection processing unit 12 operating at 1/n times period of the normal control period is added to the numerical control device. However, a configuration may be adopted in which an input detection unit 22 operating at 1/n times period of the normal control period is added to the servo 20 side, as shown in FIG. 8.

The invention claimed is:
1. A numerical control device for controlling a first control axis of a machine tool, the numerical control device comprising:
a first movement command data buffer to store movement command data commanding axis movement amount of the first control axis of the machine tool, the first control axis to operate in a first period that is shorter than a reference control period and is controlled based on a first input command input by a first external input device;
non-transitory computer readable memory; and
one or more hardware processors coupled to the non-transitory memory and configured to read instructions from the non-transitory memory to cause the numerical control device to perform operations comprising:
calculating the movement command data based on a control program at each reference control period and writing the movement command data in the first movement command data buffer;
acquiring, at the same period as the first control axis, the movement command data from the first movement command data buffer on receiving the first input command and controlling the first control axis of the machine tool; and in response to determining that a condition for starting high speed response control of the first control axis is satisfied, calculating a plurality of the movement command data commanding movement amount of an axis to be moved by the first control axis during the reference control period and writing the plurality of the movement command data in the first movement command data buffer in the process of calculating the movement command data, wherein the first input command is acquired and the first control axis is controlled without delay associated with the reference control period.

2. A numerical control device according to claim 1, wherein the first period is 1/n times of the reference control period, and the number of the plurality of movement command data is an integer n.

3. A numerical control device according to claim 2, wherein the numerical control device comprises:

a second movement command data buffer to store movement command data commanding movement amount of a second control axis, wherein the second control axis operates in a second period that is m/n times the reference control period and is based on a second input command input by a second external input device, and the operations further include:

calculating the movement command data to be used for control of the second control axis and writing the movement command data in the second movement command data buffer, and acquiring the movement command data from the second movement command data buffer at an integer m operation period of the second control axis when the second input command and transferring the movement command data to a servo control unit for controlling the second control axis.

* * * * *